UNITED STATES PATENT OFFICE.

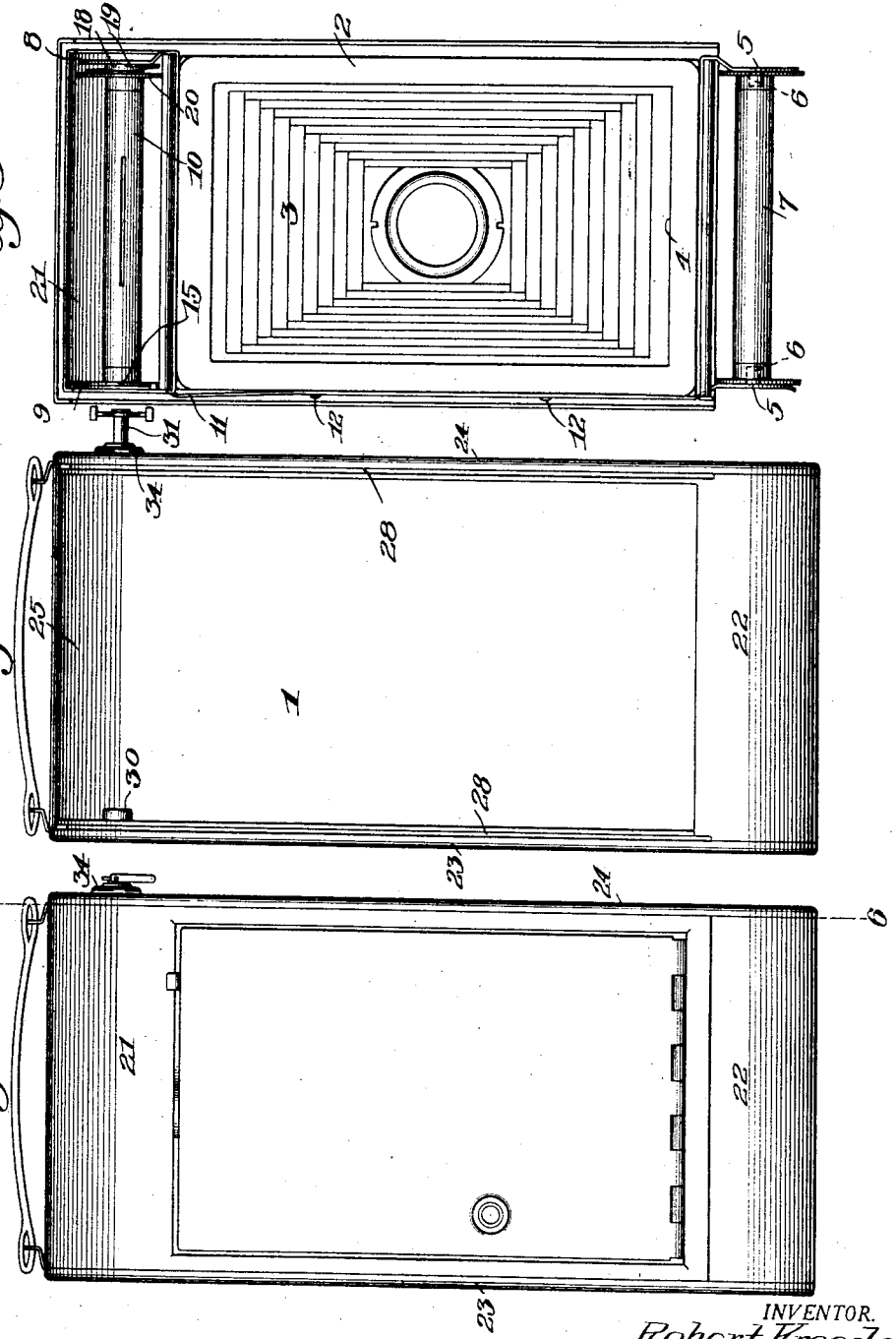

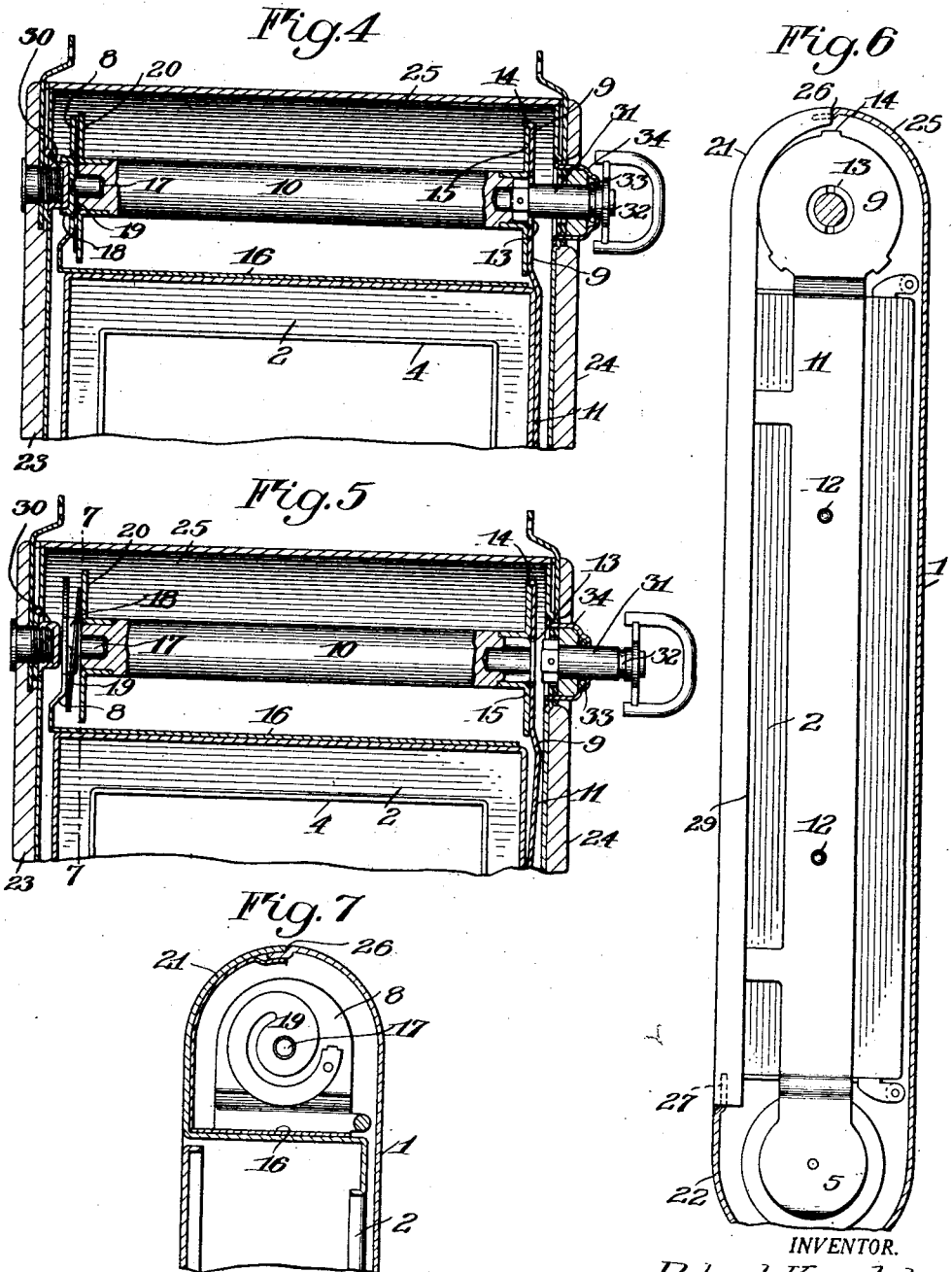

ROBERT KROEDEL, OF ROCHESTER, NEW YORK, ASSIGNOR TO EASTMAN KODAK COMPANY, OF ROCHESTER, NEW YORK, A CORPORATION OF NEW YORK.

FILM-CAMERA.

1,303,918.      Specification of Letters Patent.      Patented May 20, 1919.

Application filed February 7, 1918. Serial No. 215,756.

*To all whom it may concern:*

Be it known that I, ROBERT KROEDEL, of Rochester, in the county of Monroe and State of New York, have invented certain new and useful Improvements in Film-Cameras; and I do hereby declare the following to be a full, clear, and exact description of the same, reference being had to the accompanying drawings, forming a part of this specification, and to the reference-numerals marked thereon.

My present invention relates to photography and more particularly to photographic film cameras of the type in which a body portion comprising the bellows frame, bellows front and spool holders for feed and winding rolls, on the one hand, and a back or shell on the other, are separable from each other for the purpose of gaining access to the focal plane and the film chambers and the invention has for its object to provide a simple and convenient device for locking the said parts together. To these and other ends the invention resides in certain improvements and combinations of parts all as will be hereinafter more fully described, the novel features being pointed out in the claims at the end of the specification.

In the drawings:

Figure 1 is a front elevation of a folding pocket film camera constructed in accordance with and illustrating one embodiment of my invention;

Fig. 2 is a front elevation of the back or shell;

Fig. 3 is a rear elevation of the camera body detached from the back or shell;

Fig. 4 is a fragmentary enlarged sectional view taken axially through the winding spool of the assembled camera;

Fig. 5 is a view similar to Fig. 4 showing the parts in another position;

Fig. 6 is an enlarged sectional view taken in the plane of the inner face of one of the side walls of the back substantially on the line 6—6 of Fig. 1, and Fig. 7 is a section taken substantially on the line 7—7 of Fig. 5.

Similar reference numerals throughout the several views indicate the same parts.

The camera illustrated in the present embodiment comprises two major separable parts, an outer shell 1 which I term the back and an inner member 2 which I term the body, the latter being shown detached in Fig. 3 and the former in Fig. 2. The body comprises a frame to which the rear end of the bellows 3 is connected and defining the exposure opening 4 of the camera. On the lower side of the frame are a pair of opposed spring ears 5 carrying centers 6 upon which the film spool 7 of a feed roll is supported. At the opposite side of the body frame are two opposed film roll supports 8 and 9 for the winding spool 10. The support 9 is shown in Fig. 6 to be formed by an extension on a plate 11 secured to the frame 2 at 12 and being formed at its lower end into one of the supports 5. This support 9 has a central aperture 13 for the reception of the winding key hereinafter described and is also provided with marginal inturned lugs 14 which coöperate with the flange 15 of the spool 10 and hold it centered.

The other support 8 is also resilient, being extended from a plate 16 secured to the top of frame 2 and on its inner side it has a spool center 17 that enters the spool 10 as shown in Fig. 4 and on its outer side a socket 18. Also on the inner face I provide a spiral spring 19 carrying the center 17 and best shown in Figs. 5 and 7 which bears against the flange 20 of the spool and this spring is superior to the spring tension of the opposite support 9.

A wall 21 curved upwardly and rearwardly from the front of the frame 2 furnishes part of a film roll chamber in which the winding roll 10 operates while the feed roll chamber in which the spool 7 operates is constituted entirely by a curved wall 22 at the bottom of the back 1 and by side walls 23 and 24 thereon. The body and back are separated, of course, to load the camera and after the winding spool 10 has been placed in the supports 8 and 9, as in Fig. 5 where it is supported by the lugs 14 and the center 17, the body and back are put together by engaging the curved portion 22 of the latter upwardly over the feed spool 7 and its supports and then rocking the upper ends of the two elements together where a forwardly curved portion 25 of the back 1 meets the wall 21 on the body in a light-tight joint 26 to house the winding spool 10. The curved portion 22 of the back also interlocks in a light-tight manner with the body at 27 and the forwardly extending side walls 23 and 24 of the back are grooved at 28 in the usual manner to make a light-tight joint with a flange 29 at the front of the body, as usual.

On the side wall 23 of the back is arranged a stud 30 in alinement with the axis of the spool 10 and also in alinement with said axis the opposite side wall 24 is pierced by a winding key 31 of the usual construction. The winding key has an annular groove 32 with which coöperates a spring ring 33 confined in a casing 34 to hold the key in engagement with the spool as in Fig. 4 until forcibly retracted by the operator to the position of Fig. 5. The spool supporting ear 9 is of less strength than the spring 19 on the support 8 so that when the major elements 1 and 2 are first brought together, the spool is in the position of Fig. 5 with the support 9 deflected outwardly. When the key 31 is thereupon pressed in, it passes through the aperture 13 in the support 9 and thereby interlocks the back 1 and body 2 at that side. More than that, it thrusts the spool endwise until the support 9 occupies the position of Fig. 4 and the spring 19 is compressed and the socket 18 on the other side of the support 8 is carried into interlocking engagement with the stud 30, as is also shown in Fig. 4. This locks the back and body together on the other side and they cannot be separated until the key 31 is again withdrawn. When so withdrawn, the positions of Fig. 5 are reassumed, the key being out of the aperture 13 and the socket 18 on the other support 8 being drawn away from the stud 30 by the spring tendency of the said supporting ear. The spring 19 insures the engagement of the spool flange 15 with the lugs 14 so that there is no liability of the spool dropping out as the members are handled.

This locking of the camera parts together by means of the winding mechanism conserves parts and also the movements required of the operator in closing the camera and starting the feed of his film.

I claim as my invention:

1. In a folding film camera, the combination with a body and film roll supports at opposite sides thereof for supply and winding spools, respectively, one of said supports being movable axially of the roll, a removable back having a side portion interlocked with the body and also releasable therefrom by the axial movement of said support.

2. In a folding film camera, the combination with a body and pairs of film roll supports at opposite sides thereof for supply and winding spools, respectively, one of a pair of said supports being movable axially of the roll, of a removable back having side portions, interlocking devices on the latter and on the axially movable support engaged and released by said movement and a winding key extending through a side portion of the back and interlocking with the other support of the pair.

3. In a folding film camera, the combination with a body and pairs of film roll supports at opposite sides thereof for supply and winding spools, respectively, one of a pair of said supports being movable axially of the roll, of a removable back having side portions, interlocking devices on the latter and on the axially movable support engaged and released by said movement and a winding key extending through a side portion of the back and interlocking with the other support of the pair, said key being adapted to move the axially movable support through the medium of a film spool held in the supports.

4. In a folding film camera, the combination with a body and film roll supports at opposite sides thereof for supply and winding spools, respectively, one of said supports on one side of the body being movable axially of the roll, of a removable back interlocked directly with the body at the other side of the latter and interlocking devices on the back and the axially movable support adapted to be engaged and disengaged by such movement of the latter.

5. In a folding film camera, the combination with a body and pairs of film roll supports at opposite sides thereof for supply and winding spools, respectively, of a removable back interlocked directly with the body in the region of one pair of supports and a winding key extending through the back and through one of the other pair of supports to interlock the back and body on the other side of the latter.

6. In a folding film camera, the combination with a body and pairs of film roll supports at opposite sides thereof for supply and winding spools, respectively, one of said supports being resilient to move axially, of a back having side portions, and interlocking devices on the latter and on the resilient support adapted to be engaged and disengaged by the said axial movement of the latter.

7. In a folding film camera, the combination with a body and pairs of film roll supports at opposite sides thereof for supply and winding spools, respectively, one pair of supports being resiliently mounted to move axially of the roll, of a back having side portions, interlocking devices upon one side portion of the back and on one resilient support adapted to be engaged and disengaged by the said axial movement of the latter, the normal positions of the supports being such as to hold the interlocking devices disengaged, and a winding key extending through the other side portion and interlocking with the other resilient support, said key being adapted to cause such axial movement of the resilient supports as will cause the interlocking of the back therewith.

ROBERT KROEDEL.

Witnesses:
HELEN M. FRASER,
MARGARET DUIGNAN.